United States Patent [19]
Jorjorian et al.

[11] 4,151,939
[45] May 1, 1979

[54] CARRIER FOR CYCLES

[76] Inventors: Stephen Jorjorian; Armand A. Lachance, both of c/o Advance Industries, 72 Commercial St., Worcester, Mass. 01608

[21] Appl. No.: 912,476

[22] Filed: Jun. 5, 1978

[51] Int. Cl.² .............................................. B62J 9/00
[52] U.S. Cl. .............................. 224/33 R; 224/32 R; 224/39; 280/289 A
[58] Field of Search ............... 224/30 R, 31, 32 R, 224/32 A, 33 R, 39, 40, 42; 280/289 R, 289 A, 289 L, 202; D12/158

[56] References Cited

U.S. PATENT DOCUMENTS

| | | | |
|---|---|---|---|
| 2,527,433 | 10/1950 | La Rochelle | 224/32 R |
| 2,783,927 | 3/1957 | Harley | 224/32 R |
| 2,890,819 | 6/1959 | Glenny | 280/202 X |
| 3,301,448 | 1/1967 | Inoue | 224/32 R |
| 3,795,354 | 3/1974 | Stippich | 224/32 A |
| 3,995,803 | 12/1976 | Uitz | 224/33 A |

FOREIGN PATENT DOCUMENTS 623353  5/1949  United Kingdom ................. 224/32 R

*Primary Examiner*—Trygve M. Blix
*Assistant Examiner*—Winston H. Douglas
*Attorney, Agent, or Firm*—Charles R. Fay

[57] ABSTRACT

A double U-shaped frame for attachment to the fender of a cycle, a pair of wire baskets, preferably folding, and a detachable connection between the wire baskets and the double U-shaped frame.

10 Claims, 4 Drawing Figures

CARRIER FOR CYCLES

BACKGROUND OF THE INVENTION

At the present time there is a considerable demand for relatively inexpensive carriers for bicycles, Mo-peds, and motorcycles, and more particularly for collapsible article carrying baskets to be mounted over the rear wheel of the cycle.

There have been attempts at designing carrier basket assemblies to be located on the rear wheel of the bicycle and examples given below of such arrying baskets show that they have been of rather complex construction and are expensive to manufacture. There are proposed collapsible baskets for the rear wheel of a cycle for the purpose of providing for close parking of such cycles and to fail to interfere with storage of the cycle and the carrying thereof on another vehicle such as an automobile.

DISCUSSION OF THE PRIOR ART

A novelty search was made on the connection of the wire basket to the cycle frame and the following patents were turned up, it being pointed out that several of them show collapsible baskets or panniers, while others show solid types, but in no case does any patent show the structure of the detachable connection for the wire basket of the present invention with relation to a double U-shaped frame or carrier as in the present invention. The patents turned up on the search were:

| Patent Number | Inventor | Date |
| --- | --- | --- |
| 2,109,315 | Harley | Feb. 22, 1938 |
| 2,783,927 | Harley | Mar. 5, 1957 |
| 3,874,574 | Heise | Apr. 1, 1975 |
| 3,934,770 | Larsen | Jan. 27, 1976 |
| 3,995,803 | Uitz | Dec. 7, 1976 |
| 3,157,327 | Karbin | Nov. 17, 1964 |

SUMMARY OF THE INVENTION

A double U-shaped frame is adapted to straddle a conventional carrier e.g. on the rear fender of a cycle, and this frame has an open ended U-shaped construction at either side of the carrier and wheel. A wire basket is adapted to be removably attached with reference to the lower cross bar of each of said upwardly open-ended U-shaped frame parts, one at either side of the cycle.

The detachable connection comprises a generally downwardly open U-shaped wire member which is secured to one side of the wire basket at the inside aspect thereof, and having terminal downwardly open hooks at the ends thereof, said hooks being adapted to receive the cross bar at the bottom of the double U-shaped frame. Adjacent the top of the downwardly open U-shaped wire frame there are a pair of eyes formed in the wire; and in the U-shaped frame at corresponding points, there are openings provided therein, and these eyes and openings in pairs are adapted to receive a spring wire latch device which latches the downwardly open wire side lock frame on the basket to the legs of the upwardly open double U-shaped member at points spaced from the downwardly open hooks. This latching member has a pivotal action which allows it to be snapped in place over the upper closed end of the wire U-shaped frame, or to be released therefrom.

PREFERRED EMBODIMENT OF THE INVENTION

Figure 1:
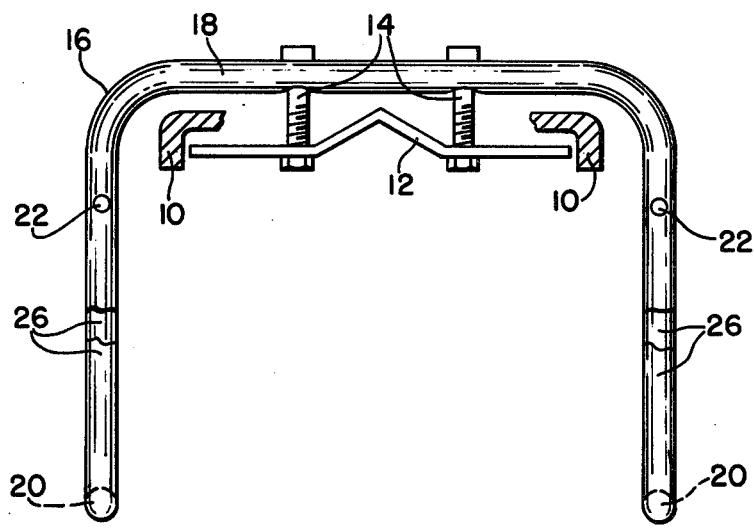
FIG. 1 is a view in elevation partly in section illustrating the double U-shaped frame attached to a carrier for a cycle.

In FIG. 1 the reference numeral 10 indicates any kind of a conventional carrier mounted in any way desired on the rear fender for instance of a motorcycle, Mo-ped or bicycle. A plate 12 is placed transversely under it and with bolts 14 secures a double U-shaped frame 16 thereto. The double U-shaped frame has two spaced cross-bars 18 which are attached to the carrier by bolts 14 by plate 12, and it has two upwardly open downwardly extending U-shaped members, one at each side of the cycle wheel and terminating in cross-bars 20,20.

In addition the double U-shaped frame is provided with openings 22 therein therebeing an opening in each one of the four depending legs of the double U-shaped frame; these depending legs being indicated at 26,26.

Figure 2:
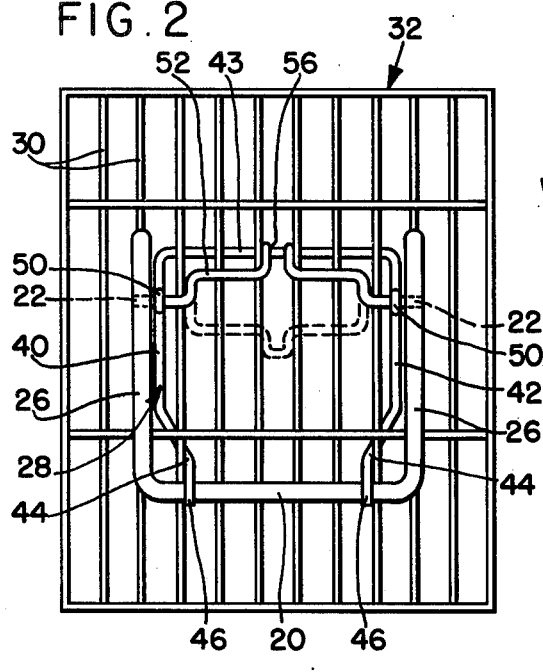
FIG. 2 is a view in side elevation illustrating a side wall of the wire basket and the downwardly open U-shaped wire frame attached thereto.
Figure 3:
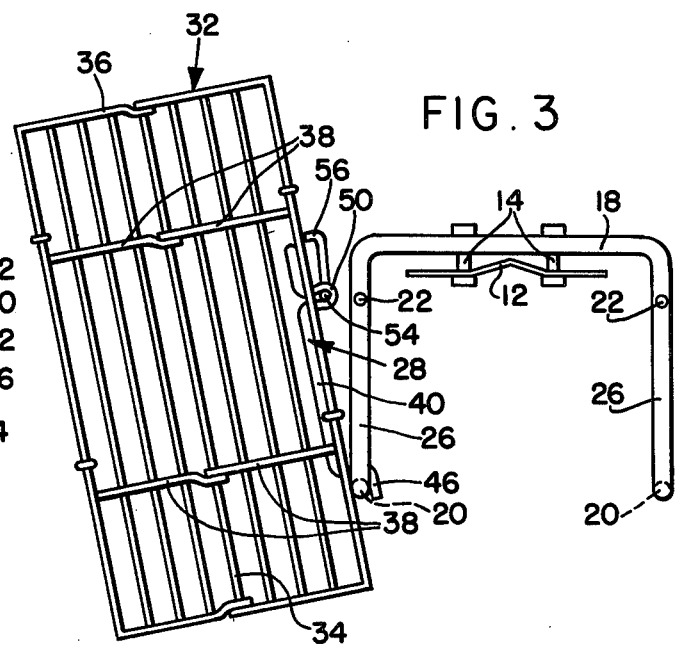
FIG. 3 is a side view thereof illustrating part of the attachment of the basket to the U-shaped frame on the cycle carrier.

As shown in FIG. 2, there is provided a downwardly open generally U-shaped wire frame generally indicated at 28 and this is welded to the members 30 of a wire basket generally indicated at 32. While this wire basket may be of any form desired it is particularly preferred to be of a size to accept and hold closely one full paper bag of groceries well-known to all; and also it is adapted to be folded as by an axis member 34 centrally located in a side wall 36 and having interpivoted connections with struts 38 so as to fold inwardly flat up against the double U-shaped frame member above-described.

The downwardly open U-shaped frame member 28 has its side members, 40,42 located within the basket as is also the cross member 43, but at 44,44 the sides 40,42 extend outwardly through the wires of the basket and terminate in outwardly thrust downwardly extending and downwardly open hooks 46,46. These hooks extend outwardly through the wall of the basket toward the U-shaped frame leg 26 and cross piece 20.

The side legs 40,42 of the wire frame are provided with outwardly extending eyes 50,50 which are capable of alignment with the holes 22,22 of the double U-shaped frame.

Figure 4:
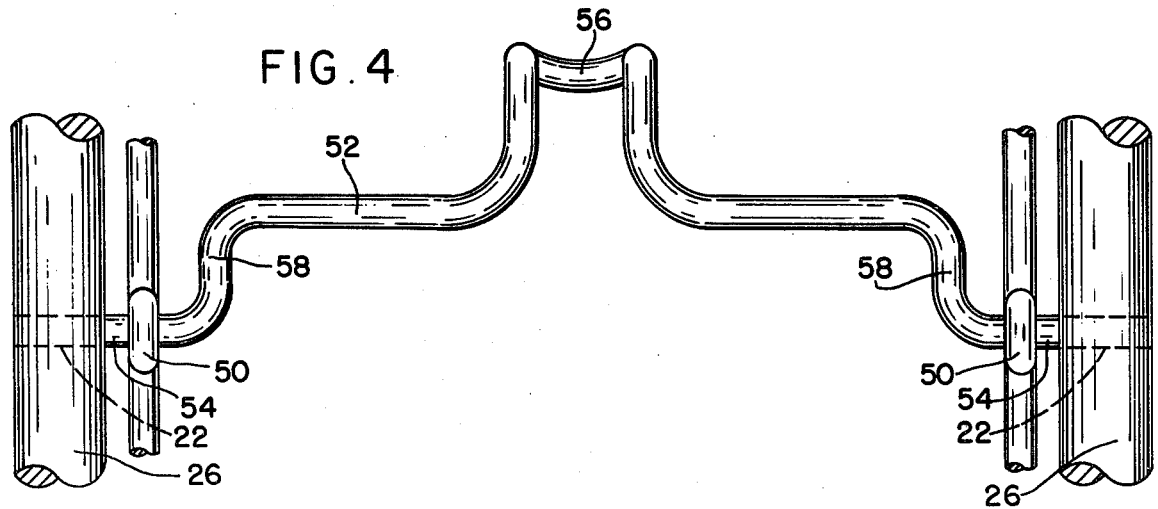
FIG. 4 is a detail view of the slide lock.

In mounting the basket on the U-shaped frame 16, cross-bar 20 is arranged to fit under hooks 46; then the basket is pivoted in towards the frame 16 until the eyes 50 align with the holes 22, when a springy wire slide lock 52 having free ends, see FIG. 4, are slid at one end into one wire eye and one opening 22, and then the other end is slid into the eye and the opening at the opposite side of the double U-shaped frame.

The slide lock 52 is shaped as shown in FIG. 4 and it can pivot on its ends 54,54 when they are located in the eyes and the holes 22. At its central portion it has a rearwardly extending pivoted lip 56 which can snap over the bar 42 forming the closed upper end of the downwardly open U-shaped wire frame.

It will be seen that the wire slide lock connects the basket to the double U-shaped frame in very secure fashion but it is easily removed therefrom to remove the basket from the bicycle. The slide lock 52 is provided with offsets 58,58 so as to insure that the slide lock once in place as shown both in solid and dotted lines in FIG. 2 cannot escape accidentally and has to be compressed slightly to free the ends 54 from holes 22 and eyes 50.

We claim:

1. The combination of a basket and a cycle carrier with a detachable connection between the basket and carrier, wherein the carrier includes a frame having a cross-bar,
    a wire frame in fixed position on the basket, said wire frame including downwardly open spaced hooks, and a pair of spaced aligned eyes spaced from the hooks,
    said carrier frame having a pair of spaced aligned openings spaced from the cross-bar,
    the eyes and openings being aligned in pairs with the hooks engaging the cross-bar, registering the wire basket frame with the carrier frame,
    and a locking member having aligned spaced ends for entering the eyes and openings in pairs locking the frames together in conjunction with the hooks.

2. The combination of claim 1 wherein the locking member is removable.

3. The combination of claim 2 including offsets on the locking member adjacent the ends thereof.

4. The combination of claim 3 wherein the locking member is pivotable on its ends,
    the locking member including a snap lip for snapping over a portion of the wire frame holding the locking member in position.

5. The combination of claim 4 wherein the snap lip is intermediate the offsets and offset from the latter.

6. The combination of claim 5 wherein the portion of the wire frame that the snap lip snaps on comprises a wire frame cross member located in the basket.

7. The combination of claim 2 wherein the locking member is of wire and is compressible to enter and remove the ends thereof relative to said eyes and openings.

8. The combination of claim 1 wherein the basket is of wire and the main portion of the wire frame is located within the basket.

9. The combination of claim 8 wherein the eyes and hooks of the wire frame extend through a wall of the basket toward the carrier frame.

10. The combination of claim 1 wherein the basket is foldable.

* * * * *